(12) United States Patent
Athley et al.

(10) Patent No.: US 11,411,310 B2
(45) Date of Patent: Aug. 9, 2022

(54) DETERMINATION OF ELECTRICAL PHASE RELATION IN A COMMUNICATIONS NETWORK

(71) Applicant: Telefonaktiebolaget LM Ericsson (publ), Stockholm (SE)

(72) Inventors: Fredrik Athley, Kullavik (SE); Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 331 days.

(21) Appl. No.: 15/540,640

(22) PCT Filed: Jun. 2, 2017

(86) PCT No.: PCT/EP2017/063459
§ 371 (c)(1),
(2) Date: Jun. 29, 2017

(87) PCT Pub. No.: WO2018/219472
PCT Pub. Date: Dec. 6, 2018

(65) Prior Publication Data
US 2018/0358695 A1  Dec. 13, 2018

(51) Int. Cl.
*H01Q 3/26* (2006.01)
*H04B 7/06* (2006.01)
(Continued)

(52) U.S. Cl.
CPC .............. *H01Q 3/267* (2013.01); *G01S 3/043* (2013.01); *G01S 3/20* (2013.01); *H01Q 3/36* (2013.01); *H01Q 21/24* (2013.01); *H04B 7/0617* (2013.01)

(58) Field of Classification Search
CPC .......... H01Q 3/267; H01Q 3/36; H01Q 21/24; G01S 3/043; G01S 3/20; H04N 7/0617
(Continued)

(56) References Cited

U.S. PATENT DOCUMENTS

| 3,176,297 A | 3/1965 | Forsberg |
| 3,636,563 A * | 1/1972 | Laverick ................ H01Q 25/02 |
| | | 342/423 |

(Continued)

FOREIGN PATENT DOCUMENTS

| EP | 0 023 606 A1 | 2/1981 |
| EP | 0023606 A1 * | 2/1981 ............. H01Q 21/29 |

(Continued)

OTHER PUBLICATIONS

Nechaev Yuri et al. ("Impact of beamspace processing on accuracy of DOA estimation using MUSIC and Capon methods", 2015 38th International Conference on Telecommunication s and Signal Processing (TSP), IEEE, Jul. 9, 2015, pp. 472-476, DOI: 10.1109/TSP.2015.7296307).*

(Continued)

*Primary Examiner* — Bernarr E Gregory
*Assistant Examiner* — Nuzhat Pervin
(74) *Attorney, Agent, or Firm* — Rothwell, Figg, Ernst & Manbeck, P.C.

(57) ABSTRACT

Mechanisms for determining an electrical phase relation between antenna elements in an antenna array. A method is performed by a radio transceiver device. The method comprises obtaining measurements of the radio signal as received in two receive beams covering a given angular sector. The two receive beams have different complex beam patterns. The method further comprises estimating the angle of arrival of the radio signal for at least one polarization port of each of the two receive beams using the measurements in (Continued)

the two receive beams. The method also comprises determining, from the angle of arrival estimated for each polarization port, an electrical phase relation between antenna elements in the antenna array that corresponds to the estimated angle of arrival.

18 Claims, 10 Drawing Sheets

(51) Int. Cl.
  *G01S 3/04* (2006.01)
  *G01S 3/20* (2006.01)
  *H01Q 3/36* (2006.01)
  *H01Q 21/24* (2006.01)

(58) Field of Classification Search
  USPC .......................................................... 342/361
  See application file for complete search history.

(56) References Cited

U.S. PATENT DOCUMENTS

| | | | |
|---|---|---|---|
| 3,824,595 | A | 7/1974 | Hall |
| 3,860,929 | A | 1/1975 | Crain |
| 3,969,726 | A * | 7/1976 | Birleson ............ G01S 13/4409 342/152 |
| 4,170,774 | A | 10/1979 | Schaefer |
| 5,053,784 | A | 10/1991 | Hippelainen |
| 5,541,608 | A | 7/1996 | Murphy et al. |
| 5,786,791 | A * | 7/1998 | Bruckert ................ G01S 5/04 342/457 |
| 6,061,022 | A | 5/2000 | Menegozzi et al. |
| 6,812,889 | B2 | 11/2004 | Alexander, Jr. |
| 6,950,064 | B2 | 9/2005 | Schantz |
| 7,042,394 | B2 | 5/2006 | Sayers |
| 7,148,845 | B2 | 12/2006 | Rooyen et al. |
| 7,242,350 | B1 | 7/2007 | Pozgay |
| 7,612,715 | B2 | 11/2009 | Macleod |
| 8,254,487 | B2 | 8/2012 | Tsai et al. |
| 8,558,735 | B2 * | 10/2013 | Bachmann ............ G01S 7/025 342/361 |
| 8,880,002 | B2 * | 11/2014 | Falck ................... H04B 7/088 343/893 |
| 9,279,884 | B2 | 3/2016 | Chung et al. |
| 9,544,036 | B2 * | 1/2017 | Peterson ............ H04B 7/0684 |
| 9,545,222 | B2 * | 1/2017 | Derchak ............ A61B 5/02055 |
| 10,705,176 | B2 * | 7/2020 | Mesecher ............ H01Q 3/2611 |
| 2002/0097783 | A1 | 7/2002 | Kimata |
| 2003/0151553 | A1 | 8/2003 | Ylitalo |
| 2005/0032531 | A1 | 2/2005 | Gong et al. |
| 2005/0047322 | A1 | 3/2005 | Sondur |
| 2006/0114158 | A1 * | 6/2006 | Chiang .................. H04B 7/086 342/424 |
| 2006/0244660 | A1 * | 11/2006 | Ann ...................... H01Q 3/26 342/377 |
| 2007/0285312 | A1 * | 12/2007 | Gao .................... H01Q 1/246 342/367 |
| 2008/0303714 | A1 * | 12/2008 | Ezal ..................... H01Q 1/28 342/417 |
| 2010/0007555 | A1 * | 1/2010 | Ezal ..................... H01Q 25/00 342/417 |
| 2011/0291892 | A1 | 12/2011 | Lecca et al. |
| 2012/0071107 | A1 * | 3/2012 | Falck .................. H04B 17/391 455/67.12 |
| 2012/0196591 | A1 * | 8/2012 | O'Keeffe ............. H01Q 1/246 455/427 |
| 2012/0212372 | A1 * | 8/2012 | Petersson ............ H01Q 21/08 343/893 |
| 2015/0061936 | A1 * | 3/2015 | Love .................... H01Q 1/246 342/372 |
| 2015/0326297 | A1 * | 11/2015 | Petersson ............ H04B 7/0408 370/329 |
| 2016/0006121 | A1 * | 1/2016 | El-Sallabi ............. H01Q 3/24 342/443 |
| 2016/0011292 | A1 | 1/2016 | Li et al. |
| 2016/0103199 | A1 * | 4/2016 | Rappaport .............. G01S 3/48 342/377 |
| 2016/0268681 | A1 * | 9/2016 | Hoole .................. H01Q 3/2611 |
| 2017/0102445 | A1 | 4/2017 | Mesecher |
| 2017/0117947 | A1 * | 4/2017 | Petersson ............ H04B 7/0617 |
| 2018/0038934 | A1 | 2/2018 | Passler et al. |
| 2019/0052331 | A1 * | 2/2019 | Chang ................. H04B 7/0626 |
| 2020/0099426 | A1 * | 3/2020 | Simonsson .......... H04B 7/0697 |

FOREIGN PATENT DOCUMENTS

| | | | | |
|---|---|---|---|---|
| EP | 0647979 | A2 | 4/1995 | |
| EP | 1689026 | A1 | 8/2006 | |
| WO | WO-2011003701 | A1 * | 1/2011 | ............. H01Q 1/246 |
| WO | 2011/050866 | A1 | 5/2011 | |
| WO | WO-2011050866 | A1 * | 5/2011 | ............. H01Q 21/08 |
| WO | 2013165149 | A1 | 11/2013 | |
| WO | WO-2014027941 | A1 * | 2/2014 | ........... G01S 5/0205 |
| WO | WO-2016007138 | A1 * | 1/2016 | ........... H04B 7/0617 |
| WO | WO-2016107365 | A1 * | 7/2016 | ............. H01Q 1/246 |
| WO | 2016/141961 | A1 | 9/2016 | |
| WO | 2016/142281 | A1 | 9/2016 | |
| WO | WO-2016142281 | A1 * | 9/2016 | ............. H01Q 1/246 |
| WO | WO-2016142281 | A1 * | 9/2016 | ............... H04B 7/10 |
| WO | 2016184214 | A1 | 11/2016 | |

OTHER PUBLICATIONS

Sung-Hoon Moon et al. ("A new gsc using monopulse angle estimation technique for fast target tracking", Phased Array Systems and Technology, 2003, IEEE International Symposium on Oct. 14-17, 2003, Piscataway, NJ, USA, IEEE, Oct. 14, 2003, pp. 158-163, ISBN:978-0-7803-7827-8).*

Xiaojing Hunang etal. ("Wideband AOA Estimation and Beamforming with Hybrid Antenna Array", Global Telecommunications Conference (Globecom2011), 2011 IEEE, Dec. 5, 2011, pp. 1-6, DOI: 10.1109/Glocom.2011.6133583 ISBN: 978-1-4244-9266-4).*

Nechaev Yuri et al. ("Impact of beam space processing on accuracy of DOA estimation using MUSIC and Capon methods", 2015 38th International Conference on Telecommunication s and SignalProcessing (TSP), IEEE, Jul. 9, 2015, pp. 472-476, DOI: 10.1109/TSP.2015.7296307) (Year: 2015).*

Xiaojing Hunang et al. ("Wideband AOA Estimation and Beamforming with Hybrid Antenna Array", Global Telecommunications Conference (Globecom 2011), 2011 IEEE, Dec. 5, 2011, pp. 1-6, DOI:10.1109/Glocom.2011.6133583 ISBN: 978-1-4244-9266-4) (Year: 2011).*

Sung-Hoon Moon et al. ("A new gsc using monopulse angle estimation technique for fast target tracking", Phased Array Systems And Technology, 2003, IEEE International Symposium on Oct. 14-17, 2003, Piscataway, NJ, USA, IEEE, Oct. 14, 2003, pp. 158-163, ISBN:978-0-7803-7827-8) (Year: 2003).*

"Direction of arrival (DOA) determination based on monopulse concepts, Nadejda Sokilova", Werner Kederer, IEEE Aug. 6, 2002 , ISBN: 0-7803-6435 (Year: 2002).*

Nadejda Sokilova "Tracking Antenna System for the nCube Project ground station HIN 2003" (Year: 2003).*

Non-Final Office Action issued in U.S. Appl. No. 15/540,628 dated Sep. 17, 2019, (18 pages).

International Search Report and Written Opinion issued in International Application No. PCT/EP2017/063428 dated Jan. 31, 2018, (16 pages).

Office Action dated May 1, 2020 issued in Indian Patent Application No. 201747022345. (6 pages).

Nechaev et al., "Impact of Beamspace Processing on Accuracy of DOA Estimation Using MUSIC and Capon Methods", 2015 38th International Conference on Telecommunications and Signal Processing (TSP), IEEE, Jul. 9, 2015, pp. 472-476, XP032792341.

(56) References Cited

OTHER PUBLICATIONS

Moon et al., "A New GSC Using Monopulse Angle Estimation Technique for Fast Target Tracking", Phased Array Systems and Technology, 2003, IEEE International Symposium on Oct. 14-17, 2003, pp. 158-163, XP010676792.
Huang et al., "Wideband AoA Estimation and Beamforming with Hybrid Antenna Array", Global Telecommunications Conference (Globecom 2011), 2011 IEEE, IEEE, Dec. 5, 2011, pp. 1-6, XP032118784.
International Search Report and Written Opinion dated Feb. 9, 2018 issued in International Application No. PCT/EP2017/063459. (15 pages).
"Amplitude-Comparison Monopulse," Wikipedia, dated Dec. 19, 2016, 2 pages.
3GPP TR 38.900 V14.1.0, "3rd Generation Partnership Project; Technical Specification Group Radio Access Network; Study on channel model for frequency spectrum above 6 GHz (Release 14)," Sep. 2016, 81 pages.
ZTE and ZTE Microelectronics, "Further clarification on assumptions for Phase 1 NR-MIMO calibration," 3GPP TSG RAN WG1 Meeting #86bis, R1-1610890, Oct. 10-14, 2016, 6 pages.
Final Office Action issued in U.S. Appl. No. 15/540,628 dated Feb. 12, 2020, (14 pages).
Kederer, Werner et al., "Direction of Arrival (DOA) Determination Based on Monopulse Concepts", Conference Paper, IEEE Explore, Feb. 2000 (4 pages).
Sokolova, Nadejda, "Tracking Antenna System for nCube project ground station", Narvik University College, 2003 (pp. 1-98).
A.G. Rilse et al., "nCube: The first Norwegian Student Satellite", Small Satellite Conference, 2003 (8 pages).

\* cited by examiner (a) Expanded Sum pattern. Total and per polarization (b) Expanded Delta pattern. Total and per polarization

DETERMINATION OF ELECTRICAL PHASE RELATION IN A COMMUNICATIONS NETWORK

CROSS REFERENCE TO RELATED APPLICATION(S)

This application is a 35 U.S.C. § 371 National Stage of International Patent Application No. PCT/EP2017/063459, filed Jun. 13, 2017, designating the United States, the disclosure of which is incorporated by reference.

TECHNICAL FIELD

Embodiments presented herein relate to a method, a radio transceiver device, a computer program, and a computer program product for determining an electrical phase relation between antenna elements in an antenna array.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

The wireless devices and/or the transmission and reception point (TRP) of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

In a communications network where the TRP at the network side uses narrow beams for transmission, at least one of the narrow transmission beams is assumed to be discovered and monitored for each served wireless device at the user side. This process of discovering and monitoring is referred to as beam management. In order to perform beam management the network node uses measurements (such as received reference signal power), as obtained to and reported by the served wireless devices, on downlink reference signals such as channel state information reference signals (CSI-RS). The beam pair for which the highest received reference signal power was obtained is then used as the active beam pair link. In general terms, a beam pair is defined by a transmission beam at the transmitting end (such as at the TRP) and a corresponding reception beam at the receiving end (such as at the wireless device), where the transmission beam and the reception beam are selected from sets of available candidate beams so as to maximize a quality criterion (such as highest received reference signal power) for transmission from the transmitting end to the receiving end.

In case a served wireless device loses beam connection with the TRP, for example due to blockage, a beam recovery procedure can be initiated to re-establish the beam connection. Such beam recovery procedure could, for example, comprise sweeping through all different combinations of TRP beams and wireless device beams. When there are many candidate beams at both the TRP and the wireless device, such beam sweeping procedure could be costly in terms of time consumption and overhead signaling. Further, in some scenarios, a wireless device could be operatively connected to different TRPs in downlink and uplink, which thus might require separate beam management procedures for downlink and uplink.

Hence, there is still a need for an improved beam management.

SUMMARY

An object of embodiments herein is to enable efficient beam management.

According to a first aspect there is presented a method for determining an electrical phase relation between antenna elements in an antenna array. The method is performed by a radio transceiver device. The method comprises obtaining measurements of the radio signal as received in two receive beams covering a given angular sector. The receive beams have different complex beam patterns. The method comprises estimating the angle of arrival of the radio signal for at least one polarization port of each of the receive beams using the measurements in the two receive beams. The method comprises determining, from the angle of arrival estimated for each polarization port, an electrical phase relation between antenna elements in the antenna array that corresponds to the estimated angle of arrival.

According to a second aspect there is presented a radio transceiver device for determining an electrical phase relation between antenna elements in an antenna array. The radio transceiver device comprises processing circuitry. The processing circuitry is configured to cause the radio transceiver device to obtain measurements of the radio signal as received in two receive beams covering a given angular sector. The receive beams have different complex beam patterns. The processing circuitry is configured to cause the radio transceiver device to estimate the angle of arrival of the radio signal for at least one polarization port of each of the receive beams using the measurements in the two receive beams. The processing circuitry is configured to cause the radio transceiver device to determine, from the angle of arrival estimated for each polarization port, an electrical phase relation between antenna elements in the antenna array that corresponds to the estimated angle of arrival.

According to a third aspect there is presented a radio transceiver device for determining an electrical phase relation between antenna elements in an antenna array. The radio transceiver device comprises processing circuitry and a storage medium. The storage medium stores instructions that, when executed by the processing circuitry, cause the radio transceiver device to perform operations, or steps. The operations, or steps, cause the radio transceiver device to obtain measurements of the radio signal as received in two receive beams covering a given angular sector. The receive beams have different complex beam patterns. The operations, or steps, cause the radio transceiver device to estimate the angle of arrival of the radio signal for at least one polarization port of each of the receive beams using the measurements in the two receive beams. The operations, or steps, cause the radio transceiver device to determine, from the angle of arrival estimated for each polarization port, an electrical phase relation between antenna elements in the antenna array that corresponds to the estimated angle of arrival.

According to a fourth aspect there is presented a radio transceiver device for determining an electrical phase relation between antenna elements in an antenna array. The radio transceiver device comprises an obtain module configured to obtain measurements of the radio signal as received in two receive beams covering a given angular sector. The receive beams have different complex beam patterns. The radio transceiver device comprises an estimate module configured to estimate the angle of arrival of the radio signal for at least one polarization port of each of the receive beams using the measurements in the two receive beams. The radio transceiver device comprises a determine module configured to determine, from the angle of arrival estimated for each polarization port, an electrical phase relation between antenna elements in the antenna array that corresponds to the estimated angle of arrival.

According to a fifth aspect there is presented a computer program for determining an electrical phase relation between antenna elements in an antenna array, the computer program comprising computer program code which, when run on a radio transceiver device, causes the radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these radio transceiver devices, this computer program, and this computer program product provide efficient beam management.

Advantageously this method, these radio transceiver devices, this computer program, and this computer program product enable the use of sequential beam sweep at the radio transceiver device to be avoided. Estimating the angle of arrival and determining the electrical phase relation in this way reduces the time to find the best analog beam pair and the overhead associated with transmission of beam finding reference signals.

It is to be noted that any feature of the first, second, third, fourth, fifth and sixth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
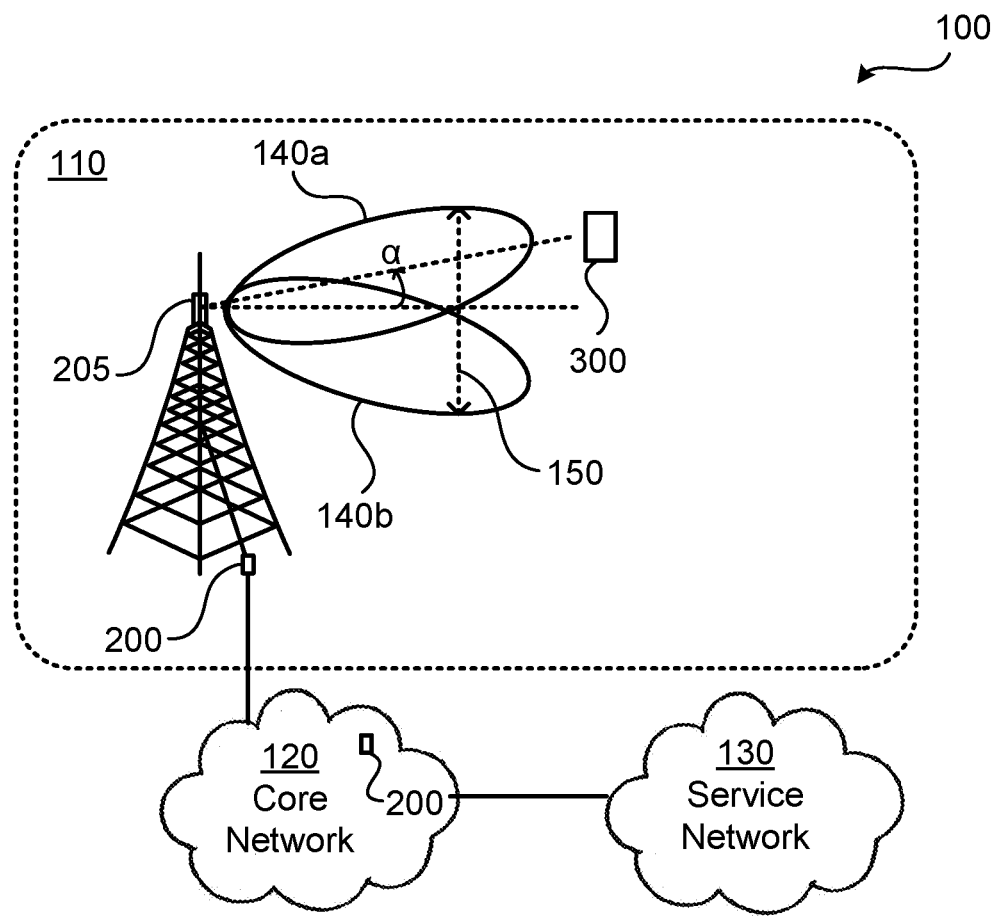
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network too comprises at least radio transceiver device 200 configured to, via TRP 205, provide network access to radio transceiver device 300 in a radio access network 110. In some embodiments radio transceiver device 300 is part of, integrated with, or collocated with, a terminal device and radio transceiver device 200 is part of, integrated with, or collocated with, a network node or the TRP 205.

The radio access network 110 is operatively connected to a core network 120. The core network 120 is in turn operatively connected to a service network 130, such as the Internet. Radio transceiver device 300 is thereby, via the TRP 205 and radio transceiver device 200, enabled to access services of, and exchange data with, the service network 130.

Examples of network nodes are radio access network nodes, radio base stations, base transceiver stations, Node Bs, evolved Node Bs, gigabit Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a receiving radio transceiver device implemented both as a radio access network node and a terminal device, or even as a receiving radio transceiver device implemented as a backhauling node or a sidelink node. Thus, although radio transceiver device 200 in at least some of the herein disclosed embodiments is described as being a network node and radio transceiver device 300 is described as being a terminal device, the functionality of the herein disclosed radio transceiver device 200 could equally be implemented in a terminal device.

For ease of description, radio transceiver device 200 thus represents a receiving radio transceiver device and radio transceiver device 300 represents a transmitting radio transceiver device although both radio transceiver devices 200, 300 could be configured for both transmission and reception. Particularly, the receiving radio transceiver device 200 is, via TRP 205, configured to receive radio signals as transmitted by the transmitting radio transceiver device 300 in two receive beams 140a, 140b. The two receive beams 140a, 140b together cover a given angular sector 150. Although only two receive beams 140a, 140b are illustrated in FIG. 1, the receiving radio transceiver device 200 could be configured to communicate using a variety of beams having different shapes and widths, herein generally referred to as having different complex beam patterns.

The radio signal transmitted by the transmitting radio transceiver device 300 is received at an angle of arrival α. Generally, the angle of arrival α is determined relative the node at which the radio signal is physically received over the radio interface. In the illustrative example of FIG. 1 this node is represented by the TRP 205.

Figure 2:
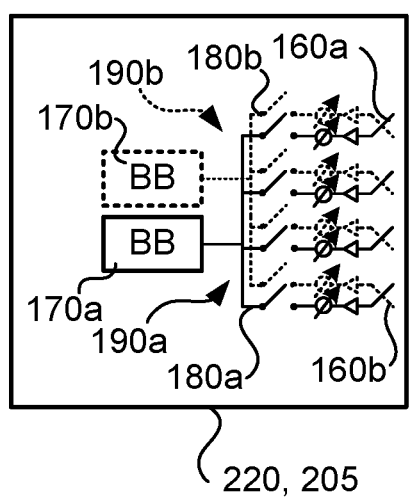
FIG. 2 schematically illustrates a communications interface and/or a transmission and reception point of a radio transceiver device according to embodiments.

In the illustrative example of FIG. 2 there are two antenna arrays 190a, 190b, each having M single polarized antenna elements 160a, 160b operatively connected to its own analog distribution network 180a, 180b (each defining an analog distribution network and configured for analog beamforming) with one phase shifter and/or gain control (and, optionally, a switch) per antenna element. In turn, each analog distribution network 180a, 180b is operatively connected to its own single baseband (BB) chain 170a, 170b. The single polarized antenna elements 160a, 160b have mutually orthogonal polarizations. The herein disclosed embodiments are not limited in terms of number of antenna arrays 190a, 190b. In general terms, the radio transceiver device 200 or the TRP 205 of the radio transceiver device 200 comprises at least one antenna array 190a, 190b. For example, the two antenna arrays 190a, 190b could be part of a communications interface 220 of the radio transceiver device 200.

The radio transceiver devices 200, 300 are assumed to be configured to use beam forming when communicating with each other. Hence, beam management may be needed in order for the radio transceiver devices 200, 300 to determine which beams to use for communicating with each other. As disclosed above when there are many candidate beams at both the receiving radio transceiver device 200 and the transmitting radio transceiver device 300 200, using a beam sweeping procedure could be costly in terms of time consumption and overhead signalling.

The embodiments disclosed herein relate to mechanisms for determining an electrical phase relation between antenna elements 160a, 160b in an antenna array 190a, 190b. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figure 3:
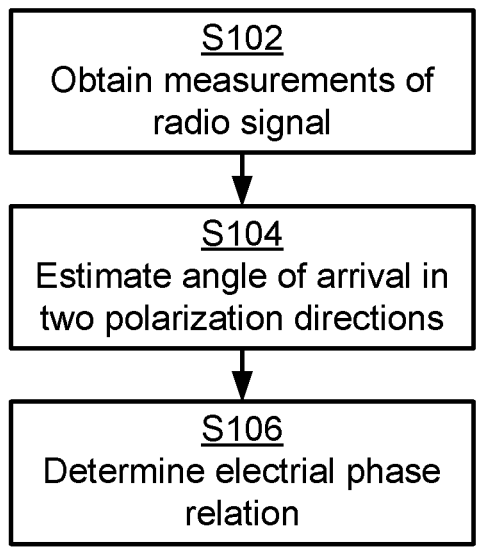
FIGS. 3 and 4 are flowcharts of methods according to embodiments.
Figure 4:
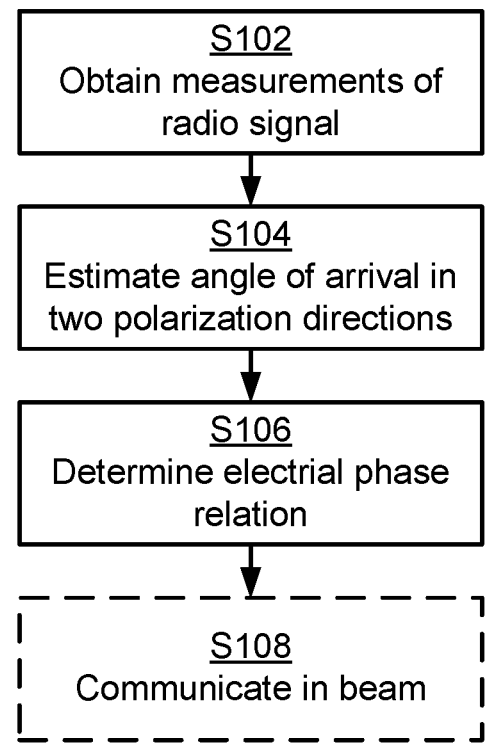

FIGS. 3 and 4 are flowcharts illustrating embodiments of methods for determining an electrical phase relation between antenna elements 160a, 160b in an antenna array 190a, 190b. The methods are performed by the radio transceiver device 200. The methods are advantageously provided as computer programs 1520.

Reference is now made to FIG. 3 illustrating a method for determining an electrical phase relation between antenna elements 160a, 160b in an antenna array 190a, 190b as performed by the radio transceiver device 200 according to an embodiment.

The method is based on the radio transceiver device 200 measuring a received radio signal in two different beams 140a, 140b so as to directly determine the best transmit and/or receive beam to use for subsequent communication with the transmitting radio transceiver device 300, without needing to perform any sequential beam sweeping. Particularly, the radio transceiver device 200 is configured to perform step S102:

S102: The radio transceiver device 200 obtains measurements of the radio signal as received in two receive beams 140a, 140b.

As disclosed above, the two receive beams 140a, 140b cover a given angular sector 150. The two receive beams 140a, 140b have mutually different complex beam patterns.

The complex beam patterns of the receive beams 140a, 140b have sufficient gain within a given angular sector 150 within which the beam finding procedure should identify which beam to use for subsequent communications with the transmitting radio transceiver device 300.

The angle of arrival α is estimated by measuring received radio signals in the two receive beams 140a, 140b. Hence, the radio transceiver device 200 is configured to perform step S104:

S104: The radio transceiver device 200 estimates the angle of arrival α of the radio signal for at least one polarization port of each of the receive beams 140a, 140b using the measurements in the two receive beams 140a, 140b.

Here, the wording of each of the receive beams refers to the polarization port (i.e. there is at least one polarization port per receive beam). That is, the measurements in both receive beams 140a, 140b are needed to estimate the angle of arrival α.

The angle of arrival α is then used to determine an electrical phase relation between the antenna elements 160a, 160b. Particularly, the radio transceiver device 200 is configured to perform step S106:

S106: The radio transceiver device 200 determines, from the angle of arrival α estimated for each polarization port, an electrical phase relation between antenna elements 160a, 160b in the antenna array 190a, 190b that corresponds to the estimated angle of arrival α.

Thus instead of performing a costly sequential beam sweeping procedure the radio transceiver device 200 is enabled to directly estimate the angle of arrival α of the received radio signal and the electrical phase relation between antenna elements 160a, 160b using only two receive beams 140a, 140b.

Embodiments relating to further details of determining an electrical phase relation between antenna elements 160a, 160b in an antenna array 190a, 190b as performed by the radio transceiver device 200 will now be disclosed.

Reference is now made to FIG. 4 illustrating methods for determining an electrical phase relation between antenna elements 160a, 160b in an antenna array 190a, 190b as performed by the radio transceiver device 200 according to further embodiments. It is assumed that steps S102, S104, S106 are performed as described above with reference to FIG. 3 and a thus repeated description thereof is therefore omitted.

According to an embodiment each receive beam 140a, 140b has two polarization ports, where the two polarization ports of each receive beam 140a, 140b have mutually different polarizations. There could then be one estimation of the angle of arrival α in each polarization port on its own. That is, according to an embodiment the angle of arrival α of the radio signal for each polarization port is estimated independently of the angle of arrival α of any other polarization ports. The angle of arrival α of the radio signal in each of the two polarization ports could represent one intermediate value, and the angle of arrival α could then be estimated using a combination of the intermediate values.

As disclosed above, the complex beam patterns of the receive beams 140a, 140b have sufficient gain within a given angular sector 150. In some aspects the two receive beams 140a, 140b are therefore generated such that at any angle within the given angular sector 150 at most one of the receive beam 140a, 140b has a power gain below a threshold when summed over the two polarization ports of each receive beam 140a, 140b. This does not, however, imply that such a summation actually is performed. However, according to an embodiment the complex beam patterns are indeed weighted and summed over the two polarization ports when estimating the angle of arrival α of the radio signal.

Examples of ways to generate the two receive beams 140a, 140b will now be disclosed.

In some aspects the two receive beams 140a, 140b are generated by analog beamforming using phase shifts only. Hence, according to an embodiment the two receive beams 140a, 140b are generated by the analog beamforming using phase shifts only.

One example of two receive beams 140a, 140b that can be used for the angle of arrival estimation is a so called sum and a delta beam. A sum beam and a delta beam can be generated in an antenna array 190a, 190b with analog beamforming using phase shifts only. A sum beam can be generated by summing the radio signals over all co-polarized antenna elements per antenna array dimension. A delta beam can be generated by applying a phase shift of π radians to one half of the antenna array before the summation.

Figure 6:
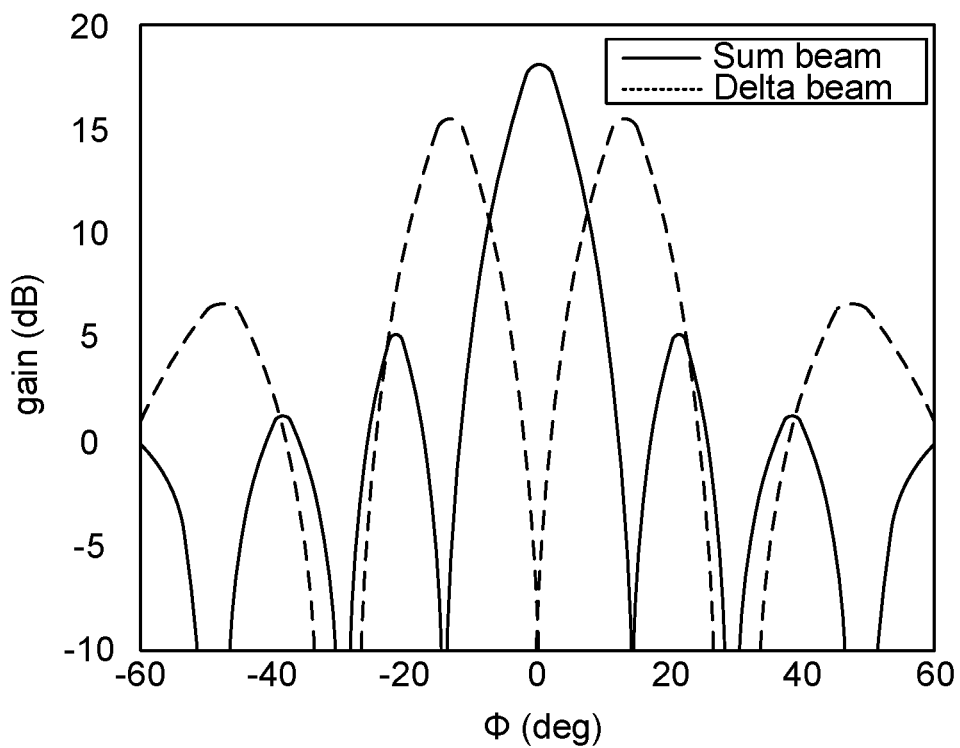
FIGS. 6, 7, 8, to shows complex beam patterns according to embodiments.

However, generating a sum beam by summing all co-polarized antenna elements in the antenna array will generate a narrow beam (and similarly for the delta beam) which leads to a limited angular coverage 150. FIG. 6 schematically illustrates an example of the complex beam patterns of sum and delta beams for an antenna array being a uniform linear array (ULA) having 8 antenna elements. This would make it difficult to estimate directions of arrival outside the mainlobe of the sum beam and therefore less useful for beam management purposes.

It is therefore proposed to generate two receive beams 140a, 140b with large beamwidth. More precisely, the complex beam patterns are generated to be adaptable to the width of the angular sector 150 within which the radio signal is assumed to be received. For example, narrower receive beams 140a, 140b with less coverage and thus higher gain can be generated whenever so need. The beam widths can also be adapted to the width of the given angular sector 150 that subsequent communications with the transmitting radio transceiver device 300 is supposed to cover.

Figure 7:
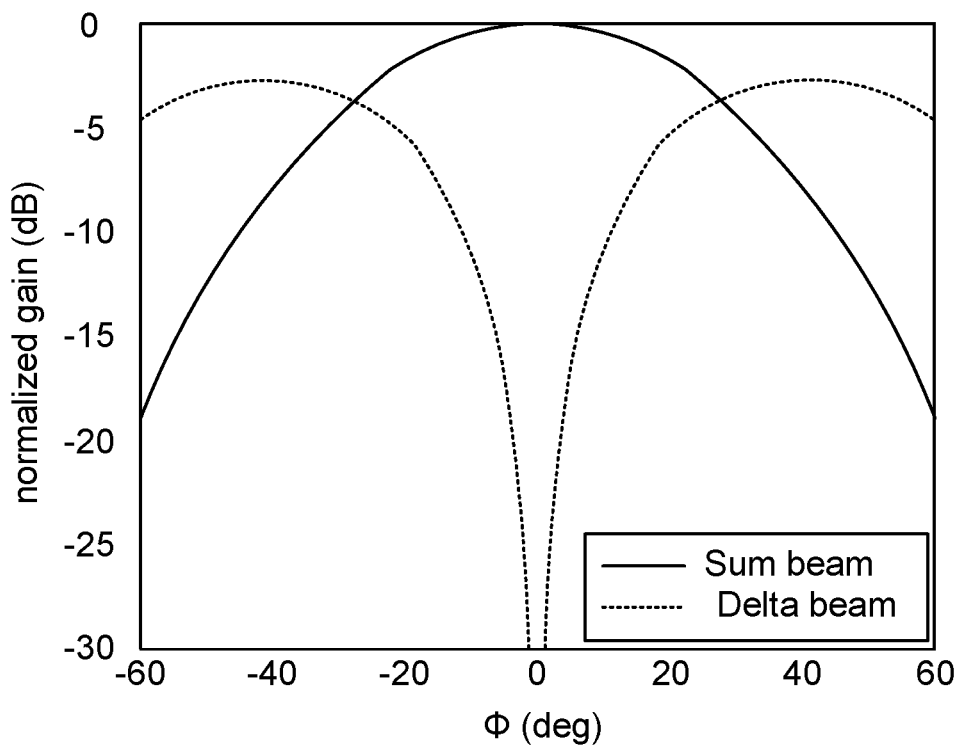

One way to achieve this is to use only two antenna elements in the array to generate the two receive beams 140a, 140b. That is, in some aspects the two receive beams 140a, 140b are generated by analog beamforming using phase shifts and amplitude tapering. Hence, according to an embodiment the two receive beams 140a, 140b are generated by the analog beamforming using a combination of phase shifts and amplitude tapering. Examples of resulting complex beam patterns are shown in FIG. 7.

However, using a combination of phase shifts and amplitude tapering it is not possible for an antenna array that lacks support for setting the amplitude gain to zero for some of the antenna elements, e.g., in an antenna array without gain control and thus with only a phase shifter to control each antenna element. According to an embodiment the two receive beams 140a, 140b are therefore generated using dual-polarization beamforming.

In further detail, by applying principles disclosed in document WO2011/050866A1 it is, for example, possible to generate as wide array beam widths (for the receive beams 140a, 140b) as the element beam width regardless of how many antenna elements there are in the antenna array, thus resulting in dual-polarization beamforming. Dual-polarization beamforming can thus be used to selectively widening or narrowing the two receive beams 140a, 140b as needed. Hence, principles disclosed in document WO2011/050866A1 can be applied to the analog beamforming network in order to generate the receive beams 140a, 140b. Other examples of principles that could be used to generate wide receive beams 140a, 140b as needed are based on optimizing complex weights of the antenna array of the analog beamforming network or by muting some antenna elements of the antenna array.

Particularly, according to an embodiment the analog beamforming in the antenna array 190a, 190b is based on a first weight matrix having a first non-zero weight vector for a first of the two polarizations and a second weight matrix having a second non-zero weight vector for a second of the two polarizations. The second weight matrix is based on the weight vectors of the first weight matrix. The first weight matrix is applied to the antenna elements 160a, 160b to generate a first of the two receive beams 140a, 140b for a first of the two polarization ports. The second weight matrix is applied to the antenna elements 160a, 160b to generate the first of the two receive beams 140a, 140b for a second of the two polarization ports. The first weight matrix and the second weight matrix here thus refer to the two polarizations for one of the beams 140a, 140b. In this respect it is noted that actual use of only one of the first and second polarizations is needed. Thus without loss of generality the actual use of the second polarization is optional. However, in this respect the second beam, however, is not optional and must be generated (with the same polarization as used for the first beam).

According to an embodiment, estimating the angle of arrival α of the radio signal comprises comparing a complex amplitude of the measurements for each of the polarization ports in the two receive beams 140a, 140b to a discriminator function.

Aspects of the discriminator function will now be disclosed.

In some aspects, the discriminator function is a complex function computed from the two complex beam patterns that uniquely maps a complex amplitude value to an angle of arrival α value. According to an embodiment the discriminator function is based on the complex beam patterns and, is within the given angular sector 150 a one-to-one function of the angle of arrival α. In some aspects the discriminator function is represented by a curve.

By measuring the radio signal as received in the two receive beams 140a, 140b and comparing with a computed discriminator function based on the complex beam patterns of the two receive beams 140a, 140b, a unique angle of arrival α of the radio signal can be estimated. One example of a discriminator function is the ratio between the two complex beam patterns. Hence, according to an embodiment the discriminator function is defined as a ratio between the complex beam patterns of the two receive beams 140a, 140b.

Figure 5:
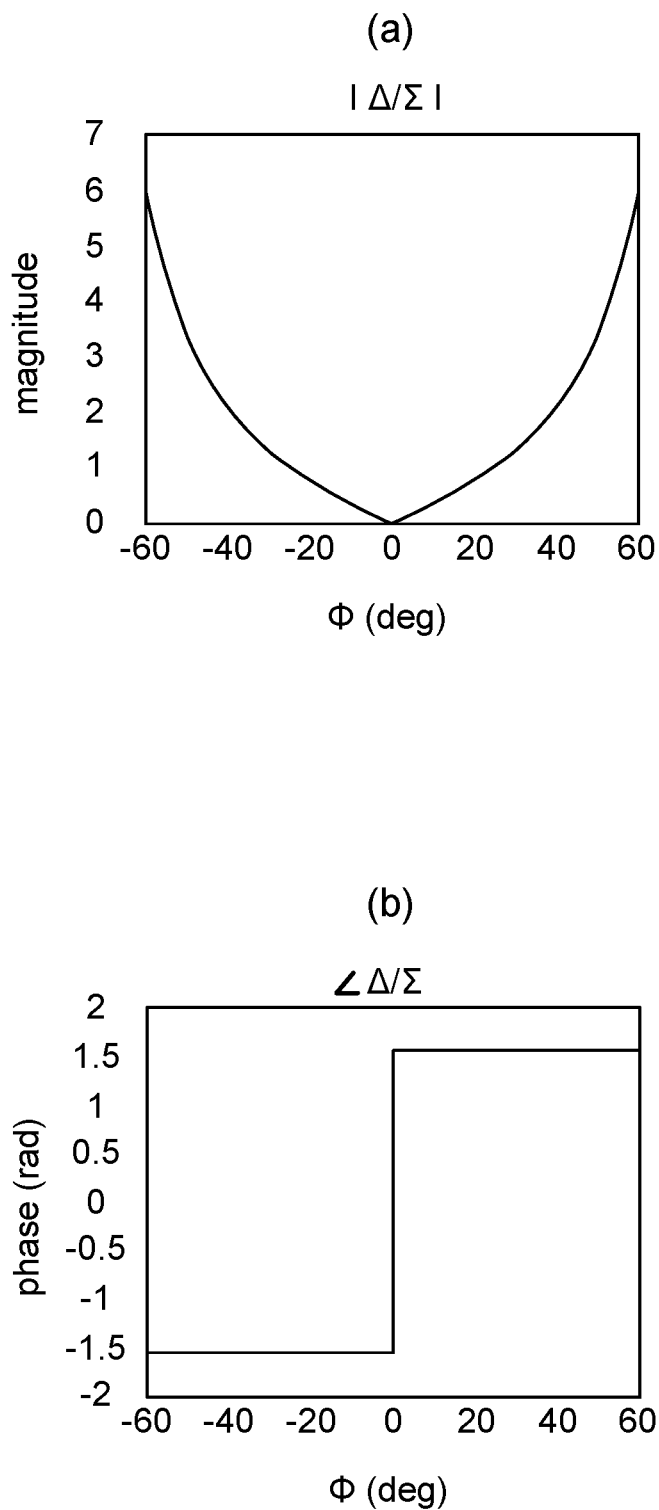
FIGS. 5, 9, 11 show magnitude and phase of discriminator functions according to embodiments.

One way to estimate the angle of arrival α from the two receive beams 140a, 140b is thus to form the discriminator function $\Delta/\Sigma$, where $\Delta$ and $\Sigma$ are defined by the complex beam patterns of the two receive beams 140a, 140b, respectively. FIG. 5 shows at (a) the magnitude and at (b) the phase of this discriminator function as a function of azimuth angle. For example, if the magnitude of $\Delta/\Sigma$ is 2 and the phase is $\pi/2$, the angle of arrival α can in the illustrative example of FIG. 5 be estimated to 40 degrees.

A way to generate wide receive beams 140a, 140b with phase shifts only is by means of the array expansion technique described in WO2016141961 A1. WO2016141961 A1 relates to beam forming using an antenna array comprising dual polarized elements. By adapting and then applying the expansion technique described in WO2016141961 A1 it is possible to generate a discriminator function per polarization that is identical to the discriminator function $\Delta/\Sigma$ for the sum and delta beams having beamwidths corresponding to the beamwidths of the virtual array (i.e., of the antenna array 190a, 190b that defines the desired beamwidth and which is expanded to the full antenna array size) used in the expansion.

Particularly, according to an embodiment the analog beamforming in the antenna array 190a, 190b is based on generating one or two beam ports. The one or two beam ports are defined by combining at least two non-overlapping virtual arrays of the antenna elements 160a, 160b. The virtual arrays of the two receive beams 140a, 140b are associated with mutually different weight vectors. A weight vector applied to a virtual array defines a virtual array port. Each virtual array has two virtual array ports. The two virtual array ports have identical power patterns and mutually orthogonal polarization. The at least two non-overlapping virtual arrays are combined via expansion weights. The expansion weights map each of the two receive beams 140a, 140b to the virtual array ports such that each receive beam, when summed over the two polarization ports, has identical power pattern to the virtual array when summed over the two virtual array ports. At least some of the expansion weights have identical non-zero magnitude and are related in phase to form the two receive beams 140a, 140b. In this respect the virtual arrays are the same in the sense that they consist of the same physical antenna elements. It is the weight vectors applied to the virtual array that are different for the two beams (e.g. weight vectors [1 1 1 1] and [1 1 −1 −1] for a sum beam and a delta beam, respectively). So it is the beam patterns of the virtual array ports that are different, not the virtual arrays themselves.

Figure 8:
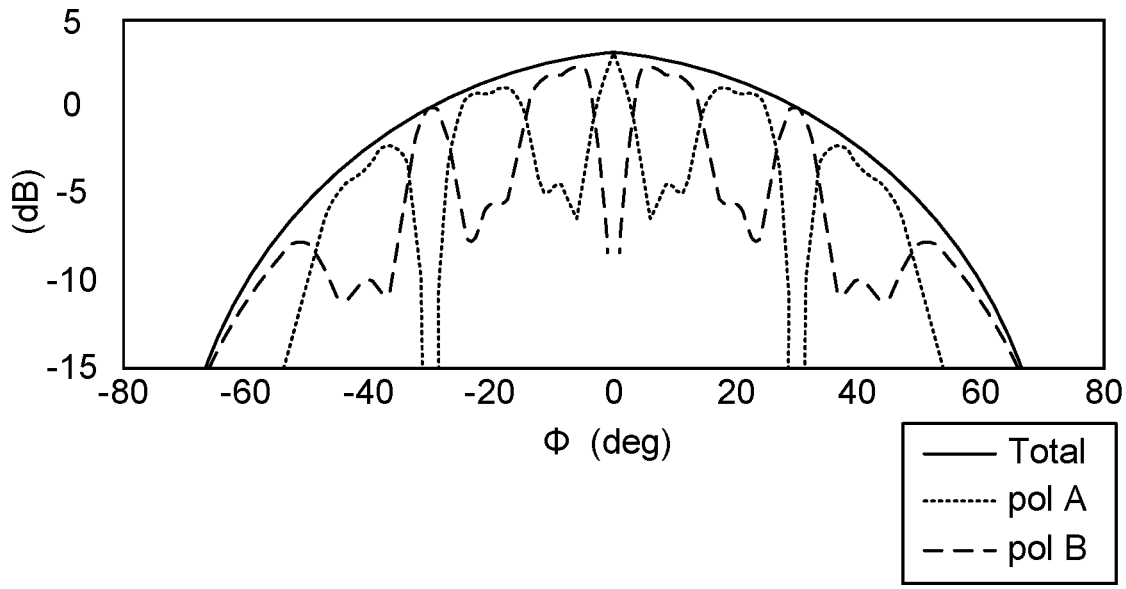
Figure 8:
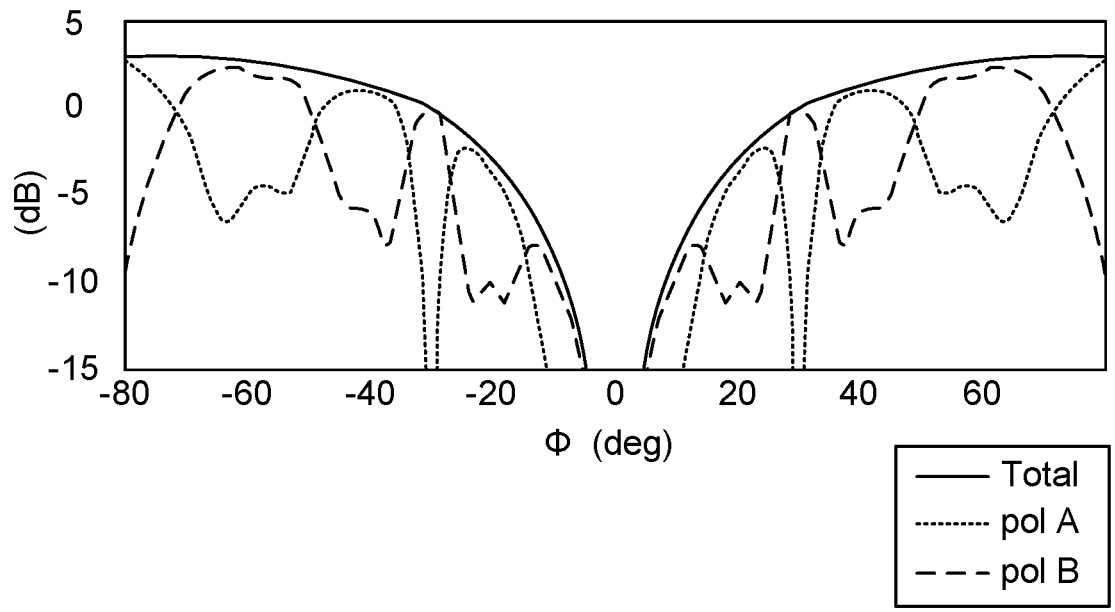

Applying the expansion technique in WO2016141961 A1 does not mean that the beam patterns for the individual polarizations have a sum and delta pattern shape, but only that the power patterns when summed over both polarizations have these shapes. This is shown in FIG. 8 where the power patterns after applying the expansion technique in WO2016141961 A1 are shown for the individual polarizations as well as the total power from both polarizations for a sum pattern (a) and a delta pattern (b). The discriminator function is thus the same for both polarizations. For example, at $\Phi=0$ degrees the curve for polarization A represents the same power relation as the total power curve.

Figure 9:
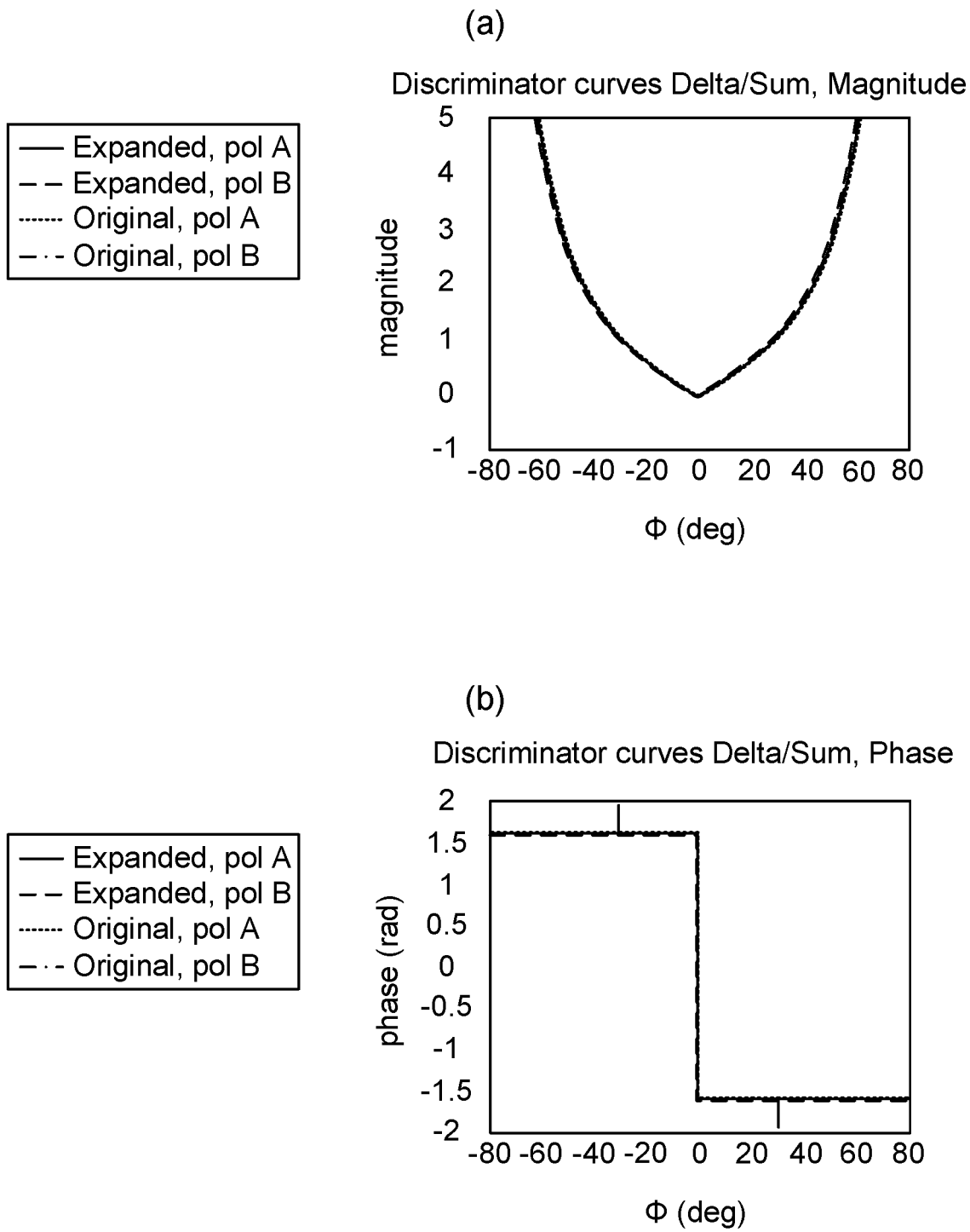

This is further demonstrated in FIG. 9, which at (a) shows the amplitude and at (b) the phase of the discriminator function for the individual polarizations as well as for the discriminator function $\Delta/\Sigma$ for the virtual array with two antenna elements having weights $[1\ 1]T$ and $[1\ −1]^T$, respectively, and antenna element separation equal to half of the wavelength, i.e., $\lambda/2$. Clearly, the discriminator functions for the individual polarizations are identical to the corresponding discriminator for a sum and delta beam generated from two antenna elements, despite that the constituent complex beam patterns are very different from a sum and delta beam. This is true except for a few points where the discriminator function has discontinuities. These points correspond to angles where the complex beam patterns in one of the polarizations have a null in gain. These discontinuities will have no impact on the angle of arrival estimation since the measurement of only the other polarization can be used at these points.

Figure 10:
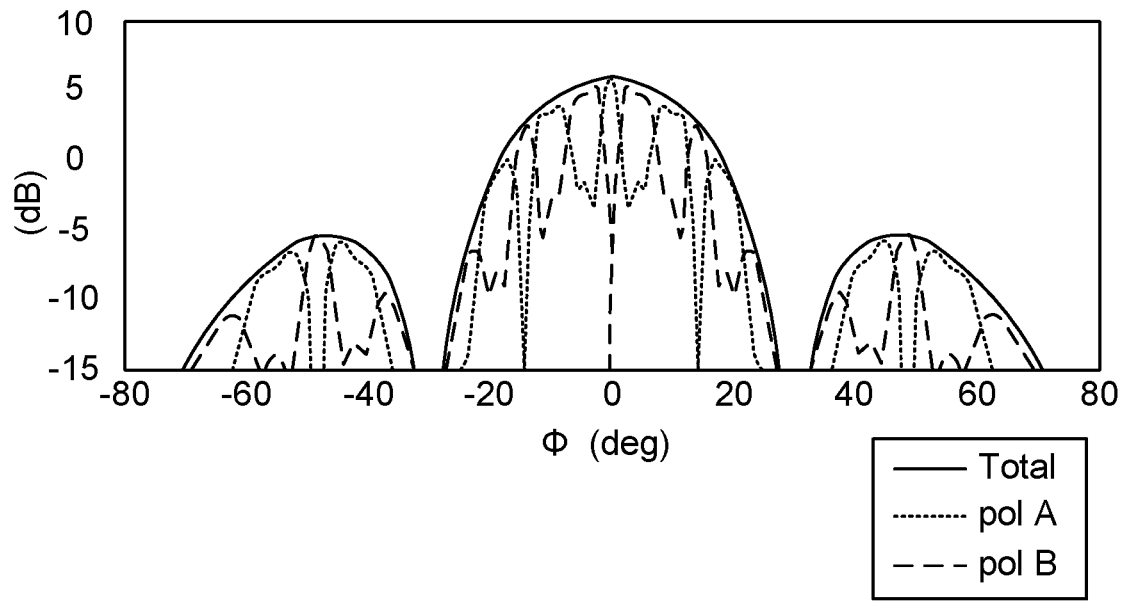
Figure 10:
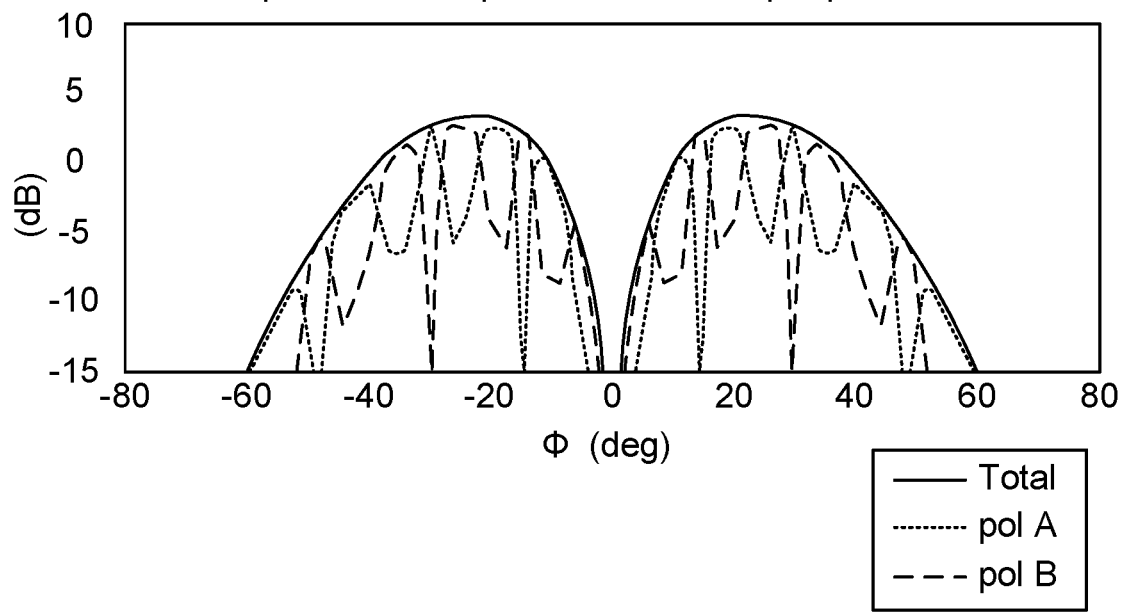
Figure 11:
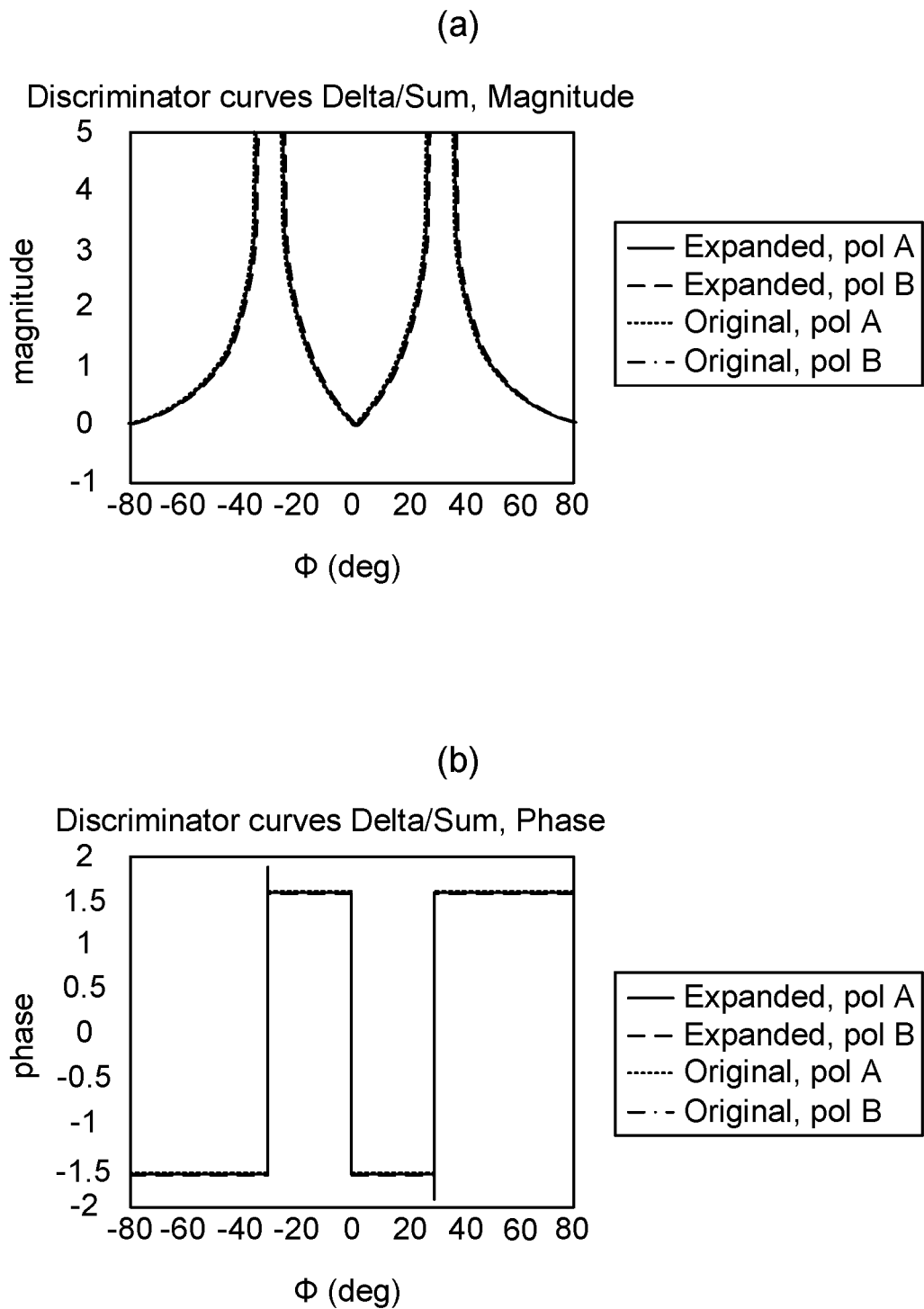

As disclosed above, beam widths for the two receive beams 140a, 140b can be adjusted according to needs. FIG. 10 and FIG. 11 show complex beam patterns and discriminator functions, respectively, for a case with a 4 antenna element virtual array having weights $[1\ 1\ 1\ 1]^T$ and $[1\ 1\ −1\ −1]^T$. This corresponds to a beam width which is half of that in the previous example. This could be used to cover a narrower given angular sector 150 and thus gives higher gain within the given angular sector 150. FIG. 11 shows that the curves of the discriminator functions are identical to each other. The discriminator function has ambiguities, but these are outside the given angular sector 150 and will therefore not impact the estimation of the angle of arrival α as part of the beam finding procedure.

In terms of virtual arrays, in some aspects the discriminator function as applied to each of the two receive beams 140a, 140b is identical to the discriminator function as applied to the virtual array ports corresponding to the two receive beams 140a, 140b. This should hold both if there is one polarization or two polarizations. In the latter case, it should hold for both polarizations.

As disclosed above, in some aspects the radio signal is a beam reference signal received from a transmitting radio transceiver device 300. The radio transceiver device 200 could therefore be configured to use the electrical phase relation in order to determine which analog beam(s) to use in subsequent data communication with the transmitting radio transceiver device 300. Particularly, according to an embodiment where the radio signal is received from another radio transceiver device 300 the radio transceiver device 200 is configured to perform step S106:

S106: The radio transceiver device 200 communicates with the so-called radio transceiver device 300 in a beam, where the beam points in a direction selected according to the electrical phase relation. The beam could be a receive beam and/or a transmit beam.

That is, assuming that the radio transceiver device 200 is configured to communicate in multiple, narrow, beams, the radio transceiver device 200 could, based on the estimated electrical phase relation, select the beam that is closest to the estimated angle of arrival α for use in subsequent data communication with the transmitting radio transceiver device 300.

Aspects of the radio signal will now be disclosed.

According to an embodiment each measurement of the radio signal corresponds to either one whole or one half orthogonal frequency-division multiplexing (OFDM) symbol such that one whole or one half OFDM symbol on which a respective one of the measurements is based on received in each of the two receive beams 140a, 140b.

In more detail, as disclosed above, using analog beamforming, two sequential measurements could be needed when the two receive beams 140a, 140b cannot be generated simultaneously. Each measurement could then involve measuring in a beam in two orthogonal polarizations. One way to obtain measurements in the two receive beams 140a, 140b is for the radio transceiver device 300 to transmit reference signals and for the radio transceiver device 200 to measure on these in two OFDM symbols. It is also possible to perform the two measurements in a single OFDM symbol by first measuring in one receive beam in the first half of an OFDM symbol, then changing the analog phase shifters to generate the other receive beam, and then measuring in the second half of an OFDM symbol in the other receive beam. Hence, in some aspects the radio transceiver device 200 obtains measurements in two consecutive (whole or half) OFDM symbols and uses a first receive beam for a first (whole or half) OFDM symbol and a second receive beam for a second (whole or half) OFDM symbol.

Figure 12:
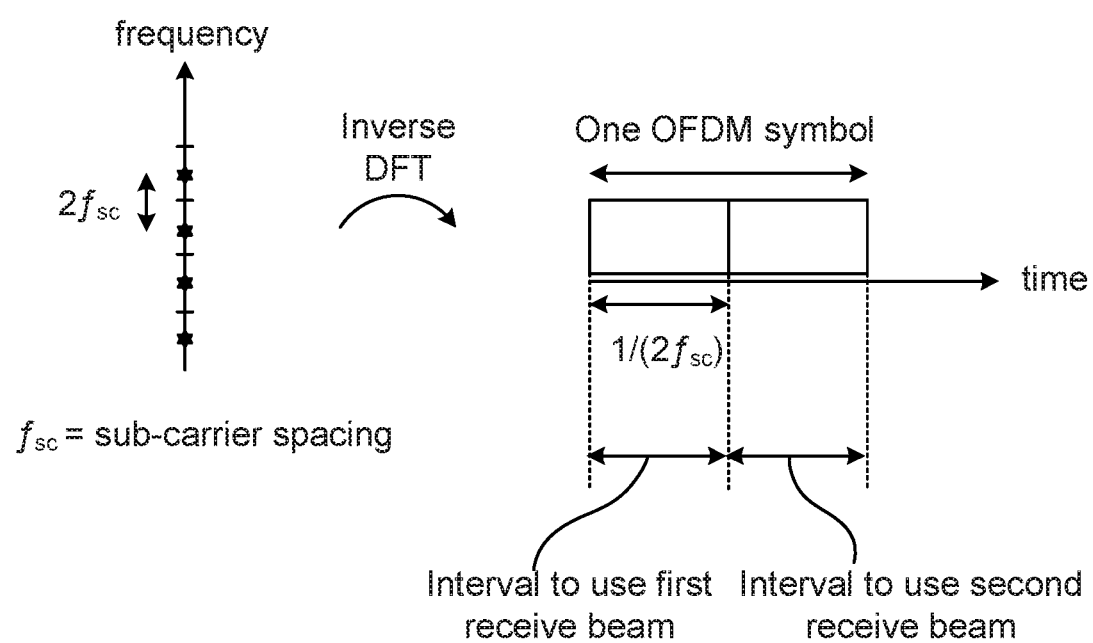
FIG. 12 schematically illustrates effects in time domain of sub-carrier spacing in frequency domain according to an embodiment.

One way to achieve this is for the radio transceiver device 300 to transmit a beam reference signal (defining the radio signal) that occupies only every second sub-carrier. Transmitting on every other sub-carrier means a zero insertion between every other sample in the frequency domain. By properties of the discrete Fourier transform (DFT), this implies a two-fold periodic repetition of the time domain signal, as illustrated in FIG. 12. FIG. 12 schematically illustrates how to generate half OFDM symbols by transmitting on every second sub-carrier. Hence, transmitting on every second sub-carrier means that the resulting OFDM symbol will consist of two identical halves and measurements in the first receive beam can then be performed in the first half and in the second receive beam in the second half (or vice versa).

Transmitting reference signals on every second subcarrier is common practice in Long Term Evolution (LTE) based communications networks where the uplink sounding reference signal (SRS) is transmitted using a so-called comb pattern, where every second or every fourth sub-carrier is occupied by a reference symbol. Therefore, performing the proposed angle of arrival estimation in a single OFDM symbol could be used with SRS-like reference signal structures. Advantages with performing measurements on both receive beams 140a, 140b in a single OFDM symbol are reduced reference signal overhead and reduced channel variation between the two successive measurements.

Figure 13:
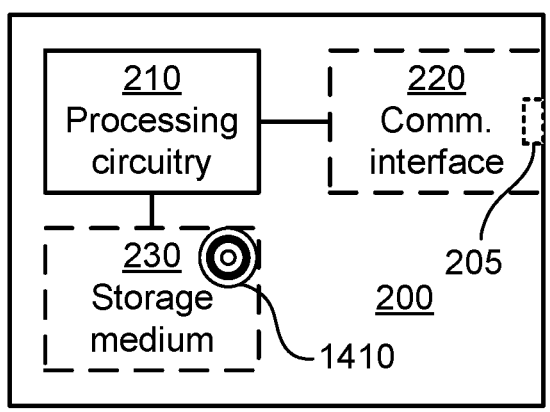
FIG. 13 is a schematic diagram showing functional units of a radio transceiver device according to an embodiment.

FIG. 13 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510 (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S108, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications at least with another radio transceiver device 300. As such the communications interface 220 may comprise one or more transmitters and receivers, comprising analogue and digital components. The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 14:
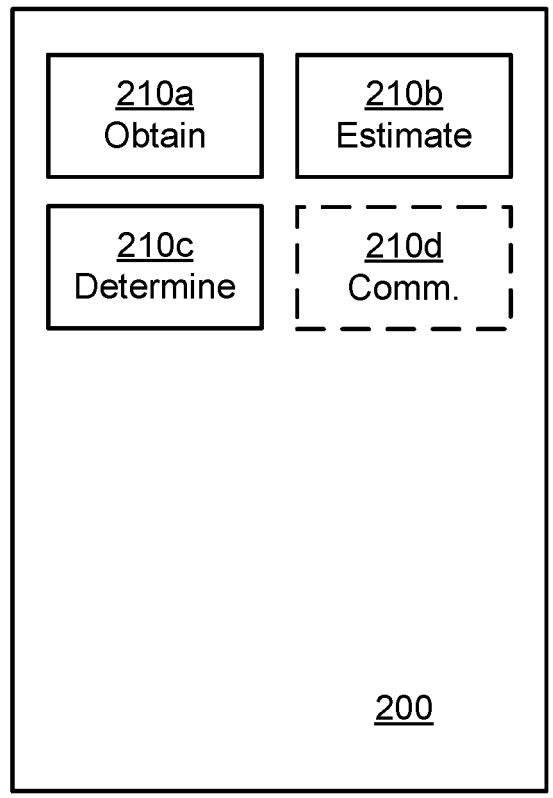
FIG. 14 is a schematic diagram showing functional modules of a radio transceiver device according to an embodiment.

FIG. 14 schematically illustrates, in terms of a number of functional modules, the components of a radio transceiver device 200 according to an embodiment. The radio transceiver device 200 of FIG. 14 comprises a number of functional modules; an obtain module 210a configured to perform step S102, an estimate module 210b configured to perform step S104, and a determine module 210c configured to perform step S106. The radio transceiver device 200 of FIG. 14 may further comprise a number of optional functional modules, such as a communicate module 210d configured to perform step SS108. In general terms, each functional module 210a-210d may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 14. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The radio transceiver device 200 may be provided as a standalone device or as a part of at least one further device. For example, the radio transceiver device 200 may be provided in a node of the radio access network or in a node of the core network. Alternatively, functionality of the radio transceiver device 200 may be distributed between at least two devices, or nodes. These at least two nodes, or devices, may either be part of the same network part (such as the radio access network or the core network) or may be spread between at least two such network parts.

Thus, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 13 the processing circuitry 210 may be distributed among a plurality of devices, or nodes. The same applies to the functional modules 210a-210d of FIG. 14 and the computer program 1520 of FIG. 15 (see below).

Figure 15:
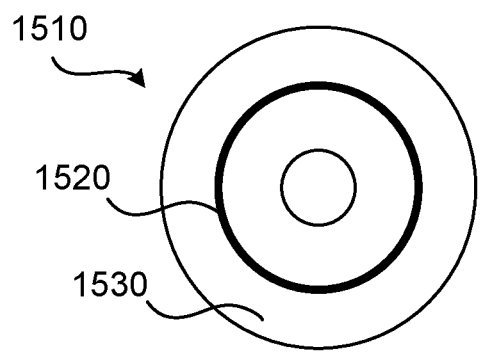
FIG. 15 shows one example of a computer program product comprising computer readable storage medium according to an embodiment.

FIG. 15 shows one example of a computer program product 1510 comprising computer readable storage medium 15300. On this computer readable storage medium 1530, a computer program 1520 can be stored, which computer program 1520 can cause the processing circuitry 210 and thereto operatively coupled entities and devices, such as the communications interface 220 and the storage medium 230, to execute methods according to embodiments described herein. The computer program 1520 and/or computer program product 1510 may thus provide means for performing any steps as herein disclosed.

In the example of FIG. 15, the computer program product 1510 is illustrated as an optical disc, such as a CD (compact disc) or a DVD (digital versatile disc) or a Blu-Ray disc. The computer program product 1510 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520 is here schematically shown as a track on the depicted optical disk, the computer program 1520 can be stored in any way which is suitable for the computer program product 1510.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining an electrical phase relation between antenna elements in an antenna array, the method being performed by a radio transceiver device, the method comprising:
    obtaining measurements of the radio signal as received in a first receive beam and a second receive beam covering a given angular sector, and wherein the first and second receive beams have different complex beam patterns;
    estimating the angle of arrival of the radio signal for at least one polarization port of each of the first and second receive beams using the measurements in the first and second receive beams; and
    determining, from the estimated angle of arrivals, an electrical phase relation between antenna elements in the antenna array that corresponds to the estimated angle of arrival, wherein
    the first receive beam has a first polarization port and a second polarization port having a polarization different than the first polarization port, and
    the second receive beam has a third polarization port and a fourth polarization port having a polarization different than the third polarization port.

2. The method of claim 1, wherein estimating the angle of arrival of the radio signal for at least one polarization port of each of the two receive beams comprises:
    estimating a first angle of arrival of the radio signal for the first polarization port;
    estimating a second angle of arrival of the radio signal for the second polarization port;
    estimating a third angle of arrival of the radio signal for the third polarization port;
    estimating a fourth angle of arrival of the radio signal for the fourth polarization port.

3. The method of claim 1, wherein the first and second receive beams are generated such that, at any angle within the given angular sector, at most one of the first or second receive beam has a power gain below a threshold when summed over the two polarization ports of each receive beam.

4. The method of claim 3, wherein the complex beam patterns are weighted and summed over the two polarization ports when estimating the angle of arrival of the radio signal.

5. The method of claim 1, wherein the angle of arrival of the radio signal in each of the two polarization ports represents one intermediate value, and wherein the angle of arrival is estimated using a combination of the intermediate values.

6. The method of claim 1, wherein the first and second receive beams are generated using dual-polarization beamforming.

7. The method of claim 6, wherein
    the first and second receive beams are generated by analog beamforming in the antenna array,
    the analog beamforming in the antenna array is based on a first weight matrix having a first non-zero weight vector for a first of the two polarizations and a second weight matrix having a second non-zero weight vector for a second of the two polarizations,
    the second weight matrix is based on the weight vectors of the first weight matrix,
    the first weight matrix is applied to said antenna elements to generate a first of the first and second receive beams for a first of the two polarization ports, and the second weight matrix is applied to said antenna elements to generate said first of the first and second receive beams for a second of the two polarization ports.

8. The method of claim 6, wherein
the first and second receive beams are generated by analog beamforming in the antenna array,
the analog beamforming in the antenna array is based on generating one or two beam ports, wherein the one or two beam ports are defined by combining at least two non-overlapping virtual arrays of the antenna elements, wherein the virtual arrays of the first and second receive beams are associated with mutually different weight vectors, wherein a weight vector applied to a virtual array defines a virtual array port,
each virtual array has two virtual array ports, the two virtual array ports having identical power patterns and mutually orthogonal polarization, wherein the at least two non-overlapping virtual arrays are combined via expansion weights,
the expansion weights map each of the first and second receive beams to the virtual array ports such that each receive beam, when summed over the two polarization ports, has identical power pattern to the virtual array when summed over the two virtual array ports, and
at least some of the expansion weights have identical non-zero magnitude and are related in phase to form the first and second receive beams.

9. The method of claim 1, wherein estimating the angle of arrival of the radio signal comprises comparing a complex amplitude of the measurements for each of the polarization ports in the first and second receive beams to a discriminator function.

10. The method of claim 9, wherein the discriminator function is based on the complex beam patterns and is, within the given angular sector, a one-to-one function of the angle of arrival.

11. The method of claim 9, wherein the discriminator function is defined as a ratio between the complex beam patterns of the first and second receive beams.

12. The method according to claim 8, wherein
estimating the angle of arrival of the radio signal comprises comparing a complex amplitude of the measurements for each of the polarization ports in the first and second receive beams to a discriminator function, and
the discriminator function as applied to each of the first and second receive beams is identical to the discriminator function as applied to the virtual array ports.

13. The method of claim 1, wherein the signal is received from another radio transceiver device, the method further comprising:
communicating with said another radio transceiver device in a beam pointing in a direction selected according to the electrical phase relation.

14. The method of claim 1, wherein each measurement of the radio signal corresponds to either one whole or one half orthogonal frequency-division multiplexing, OFDM, symbol such that one whole or one half OFDM symbol on which a respective one of the measurements is based on received in each of the first and second receive beams.

15. A radio transceiver device for determining an electrical phase relation between antenna elements in an antenna array, the radio transceiver device comprising processing circuitry, the processing circuitry being configured to cause the radio transceiver device to:
obtain measurements of the radio signal as received in first and second receive beams covering a given angular sector, and wherein the first and second receive beams have different complex beam patterns;
estimate the angle of arrival of the radio signal for at least one polarization port of each of the first and second receive beams using the measurements in the first and second receive beams; and
determine, from the angle of arrivals, an electrical phase relation between antenna elements in the antenna array that corresponds to the estimated angle of arrival, wherein
the first receive beam has a first polarization port and a second polarization port having a polarization different than the first polarization port, and
the second receive beam has a third polarization port and a fourth polarization port having a polarization different than the third polarization port.

16. A radio transceiver device for determining an electrical phase relation between antenna elements in an antenna array, the radio transceiver device comprising:
processing circuitry; and
a storage medium storing instructions that, when executed by the processing circuitry, cause the radio transceiver device to:
obtain measurements of the radio signal as received in first and second receive beams covering a given angular sector, and wherein the first and second receive beams have different complex beam patterns;
estimate the angle of arrival of the radio signal for at least one polarization port of each of the first and second receive beams using the measurements in the first and second receive beams; and
determine, from the angle of arrivals, an electrical phase relation between antenna elements in the antenna array that corresponds to the estimated angle of arrival, wherein
the first receive beam has a first polarization port and a second polarization port having a polarization different than the first polarization port, and
the second receive beam has a third polarization port and a fourth polarization port having a polarization different than the third polarization port of the second receive beam.

17. A computer program product comprising a non-transitory computer readable medium storing a computer program for determining an electrical phase relation between antenna elements in an antenna array, the computer program comprising computer code which, when run on processing circuitry of a radio transceiver device, causes the radio transceiver device to:
obtain measurements of the radio signal as received in first and second receive beams covering a given angular sector, and wherein the first and second receive beams have different complex beam patterns;
estimate the angle of arrival of the radio signal for at least one polarization port of each of the first and second receive beams using the measurements in the first and second receive beams; and
determine, from the angle of arrivals, an electrical phase relation between antenna elements in the antenna array that corresponds to the estimated angle of arrival, wherein
the first receive beam has a first polarization port and a second polarization port having a polarization different than the first polarization port of the first receive beam, and the second receive beam has a third polarization port and a fourth polarization port having a polarization different than the third polarization port.

18. A method for beam management, the method being performed by a first radio transceiver device (RTD), the method comprising:

using a first receive beam to obtain a first radio signal measurement of a radio signal transmitted by a second RTD;

using a second receive beam to obtain a second radio signal measurement of the radio signal transmitted by the second RTD, wherein the first and second receive beams have different complex beam patterns;

using the first and second radio signal measurements, estimating the angle of arrival of the radio signal transmitted by the second RTD;

determining, from the estimated angle of arrival, an electrical phase relation between antenna elements in an antenna array;

determining a direction based on the determined electrical phase relation;

selecting a beam pointing in the determined direction; and using the selected beam to communicate with the second RTD.

* * * * *